United States Patent [19]

Gray

[11] Patent Number: 4,717,866

[45] Date of Patent: Jan. 5, 1988

[54] STEPPING MOTOR EXCITATION SEQUENCES

[75] Inventor: Roger M. Gray, Lewisville, Tex.

[73] Assignee: Archive Corporation, Costa Mesa, Calif.

[21] Appl. No.: 855,608

[22] Filed: Apr. 23, 1986

[51] Int. Cl.$^4$ ............................................. H02P 8/00
[52] U.S. Cl. ..................................... 318/696; 318/685
[58] Field of Search ................................. 318/696, 685

[56] References Cited

U.S. PATENT DOCUMENTS 4,600,868  7/1986  Bryant ................................. 318/567

OTHER PUBLICATIONS

"Damping and the Step Motor," Vince Coughlin, pp. 55–57, *Design Engineering*, Sep. 1980.
"Step Motor Drive Circuitry and Open Loop Control," pp. B1, B23–B28, J. Maginot and W. Oliver, presented at the Third Annual Symposium on Incremental Motion Control Systems and Devices held at the University of Illinois at Urbana–Champaign in 1974.

*Primary Examiner*—William M. Shoop, Jr.
*Assistant Examiner*—Saul M. Bergmann
*Attorney, Agent, or Firm*—Knobbe, Martens, Olson & Bear

[57] ABSTRACT

A method and apparatus for driving a stepping motor in its single stepping mode of operation by supplying a series of alternate forward and reverse phases whereby the motor is caused to rotate through a single step. The motor may be operated in its slewing mode by supplying a series of alternate phases for each step in a series of steps.

33 Claims, 14 Drawing Figures

STEPPING MOTOR EXCITATION SEQUENCES

BACKGROUND OF THE INVENTION

This invention relates generally to a method of driving a stepping motor and more particularly to the precise positioning of the magnetic read/write head in a streaming cartridge tape drive with the use of a stepping motor.

Streaming cartridge tape drives are used in computer systems to store digital data on magnetic tape. Data is recorded on the magnetic tape in a serial fashion along a plurality of substantially parallel data tracks which run the length of the tape. When one track has been fully read from or written to, the direction of the tape is reversed, and another data track is read from or written to in the opposite direction. This bi-directional capability of the movement of the tape over the magnetic head obviates the need for rewinding the tape after each track is accessed. This back and forth recording of data along a plurality of data tracks one at a time is known as "serpentine" recording.

The magnetic tape used in streaming cartridge systems is commonly one-fourth of an inch in width and may be up to 450 feet in length. There may be twenty parallel data tracks between the edges of the quarter-inch tape. In order to access each of these tracks to read or write data, the magnetic read/write head must be precisely positioned over each track. If the magnetic head is not accurately positioned over the proper data track, data transmission errors may occur from reading data from the wrong track or writing data on the wrong track, which may result in a loss of data.

These precise positioning requirements are accomplished with the use of a stepping motor. When subject to a discrete number of electrical excitations, a stepping motor rotates through precise angular increments, one increment for each excitation. When the motor is coupled to the magnetic read/write head via a conventional means for translating the angular displacement of the motor to linear displacement, such as a lead screw, the position of the magnetic head can be precisely controlled.

There are stringent time requirements in the tape drive system within which the magnetic head must be moved from one position to another. Some of these head movements are short, only requiring the stepping motor to be rotated through a single step. It is also required that the head be moved a distance equivalent to many steps of the motor. In this latter mode, the motor continuously rotates through many steps, only stopping when the final position is reached. This mode of operation is called "slewing."

The stepping motor is operated in its slewing mode when the head must be moved from one data track to another, since the distance between data tracks is equivalent to many steps of the motor. It is advantageous that the motor be slewed as quickly as possible without loss of positional integrity.

Several methods of improving the performance of a stepping motor in its slewing mode of operation have been employed in the past. One such method involves "ramping" the speed of the stepping motor up to its slewing frequency, running the motor at the slewing frequency for a predetermined period of time, then ramping the speed down until the motor comes to rest. In order to produce these ramps, a series of excitations must be transmitted to the motor separated by varying periods of time. For example, during the ramp up period, the time period between the first and second excitations might be 14 milliseconds, while the time period between the second and third is 12 ms, and the period between the third and fourth is 10 ms, and so on. Such an excitation sequence is called a "ramp profile." When the slewing frequency is reached, the motor is excited at a constant rate.

There are several disadvantages to this method of slewing a stepping motor. First, exciting the motor at varying time intervals during the ramp periods adds unnecessary complexity to the driving circuit. In addition, in some cases different ramp profiles need to be used depending upon how many steps need to be taken. Thus, storage of multiple ramp profiles may be required. A second disadvantage to this method is that the slewing frequency is limited by resonance effects inherent in the motor. As a result, this method of exciting the motor results in an unnecessarily low limit on the slewing frequency in some applications, depending on the locations of load resonance.

A slight modification of the ramping method incorporates the use of backphasing during the final step in a series of steps. This final-step backphasing in the slewing mode consists of applying a series of alternating forward and reverse phases to the motor. The effect of the alternate reverse phases is to act as a brake on the rotor, thus reducing the time required for the rotor to settle to its final stop position. Each of the steps preceding the final step is produced by supplying an excitation consisting of a single forward phase. No backphasing is utilized in this method for any step other than the final step in a series of steps.

While the time required for the motor to settle to its final position is reduced, this modified ramp method of exciting the motor retains the disadvantages described above of the necessity for multiple ramp profiles and the unnecessarily low limit on slewing frequency.

The motor must also be capable of moving a single step and coming quickly to rest. One procedure which requires the motor to be operated in its single step mode is invoked before data is written to tape. Writing data to the tape requires that the magnetic head first find the edge of the tape, and then write the first data track at a predetermined distance from this edge. In order to find the edge of the tape, the magnetic head is first positioned at a predetermined starting point. A single excitation is then transmitted to the stepping motor to cause it to rotate through one angular increment, or step, thus moving the head a fixed distance, which may be, for example, one-thousandth of an inch. After the step is completed, an edge-of-tape test is performed. If the edge is found, the head may be moved the predetermined distance to the first track. If the edge is not found, the motor is moved another step and the edge-of-tape test is repeated.

Due to manufacturing tolerances and lateral movement of the tape, many single steps of the motor may be required before the edge of the tape is found. This would not present a problem if each single step were performed quickly. However, conventional stepping motors, which have a single step response which is oscillatory, require a certain amount of settling time after each step is taken. Since the edge-of-tape test cannot be performed until the oscillations of the motor have terminated, time is wasted waiting for the oscillations to die out.

A different procedure is used to find the first data track prior to reading a magnetic tape which has previously been written. Instead of looking for the tape edge, the magnetic head looks for a fixed-length reference burst which lies between the beginning of the tape and the start of the data tracks and is aligned with the first data track that is to be written. This procedure comprises advancing the magnetic head by a single step and then reading the portion of the tape between the beginning of the tape and the beginning of the data tracks until the reference burst is found. Since this portion of the tape preceding the start of the data tracks is relatively short, if the reference burst is not found by the time the magnetic head reaches the start of the data tracks, the tape must be rewound. Rewinding the tape from a point just past the start of the data tracks to its beginning takes a considerable amount of time. It is thus advantageous to perform as many tests for the reference burst as possible before the tape needs to be rewound. Since the magnetic head cannot effectively read the reference burst until the head has stopped oscillating after each step, the oscillatory periods contribute to an undesirably long delay in finding the reference burst due to the time it takes for the oscillations to decay as well as the extra tape rewinding time.

An attempt to solve the problem of an undesirably long oscillatory period following a single step of a stepping motor has been made. The single step response of a stepping motor has been shortened by a technique called "back phasing damping." This technique involves turning on a reverse phase of the stepping motor once to decelerate the rotor during the last portion of the step. When the final position is reached, the forward phase is turned back on.

While this technique results in shortening the single step response of the motor, its use in a system having significant load variations as seen by the motor can cause problems. When back phasing damping is used, if the time at which the reverse phase is activated is too early, the stepping motor will tend to return to its starting position. When the final forward phase is subsequently turned on, the motor will oscillate in a manner similar to its undamped single step response. If the reverse phase is activated too late, the stepping motor will have an undesirable amount of oscillation about its final resting position.

Where there are significant load variations in the system, unless the time at which the reverse phase is activated is varied depending upon the load, some of the reverse phases will be activated too early and some too late. For example, if the load seen by the motor increases from the previous step, the time at which the reverse phase is activated will be too early, and the motor will not have enough inertia to reach the next step when the reverse phase is activated. As a result, the motor will tend to return to its starting position. When the final forward phase is subsequently turned on, the motor will oscillate in a manner similar to its undamped single step response.

While these problems could be overcome with a closed loop feedback system for continuously sensing the position of the rotor within the stepping motor, the additions of such systems would add increased cost and complexity.

SUMMARY OF THE INVENTION

This invention solves the stepping motor performance problems described above by providing a novel method of driving a stepping motor in its single-stepping mode of operation. This is accomplished by generating a forward excitation, or phase, which tends to advance the rotor in a stepping motor to the next angular position and a reverse excitation, or phase, which tends to cause the rotor to occupy its previous angular position in the motor. The single-stepping performance is improved by supplying to the motor a series of alternating forward and reverse excitations. As a result of this alternating series, the acceleration of the rotor within the motor is controlled so that the resultant single-step response of the motor approximates its critically damped response.

Another important feature of the invention includes a novel method of driving a stepping motor in its slewing mode of operation. In its slewing mode, a stepping motor rotates through a plurality of steps before it stops. The steps of a stepping motor driven in its slewing mode of operation in accordance with the invention are caused by excitation sequences which include alternating sequences of forward and reverse phases. As a result, the slewing frequency which can be attained is significantly increased. In addition, the time required for the rotor to settle to its final position is greatly reduced.

These and other objects, features, and advantages of the present invention will be apparent to those of ordinary skill in the art in view of the detailed description of the preferred embodiments, which is made with reference to the drawings described below.

DETAILED DESCRIPTION OF THE PREFERRED EMBODIMENTS

Figure 2:
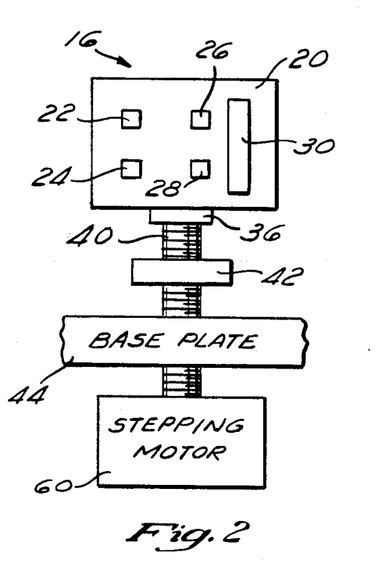
FIG. 2 is a schematic view of a magnetic read/write head and motor assembly used in a cartridge tape drive.

FIG. 2 illustrates a magnetic read/write head and stepping motor assembly 16 used in a streaming cartridge tape drive. The assembly 16 comprises a magnetic read/write head 20, a coupler 36, a lead screw 40, a collar 42, and a stepping motor 60. The magnetic head 20 is coupled to the lead screw 40 so that the vertical position of head can be adjusted by the rotation of the screw, which is controlled by the stepping motor 60. The portion of the lead screw 40 between the collar 42 and the motor 60 passes through a base plate 44 connected to the tape drive.

The base plate 44 is used as a mechanical stop, or reference point, from which a variety of head positions may be measured as a number of discrete steps of the stepping motor 60. The base plate 44 cooperates with the collar 42 to provide this capability. The collar 42 is fixed with respect to and rotates with the lead screw 40. The head 20 can be considered to be at its reference point, or at "home," when the bottom surface of the collar 42 is flush with the base plate 44.

Each step, or angular rotation, of the stepping motor 60 causes the lead screw 40 to raise or lower the head a fixed amount, depending upon the direction of rotation. Thus, distances can be measured as a number of steps. The distance the head 20 moves per step depends upon the particular stepping motor, lead screw, and head coupling mechanism used. In one embodiment of the invention, the head 20 is moved one-thousandth of an inch per step.

If it is known that a particular location lies a certain distance from home, this location can be reached by first moving the head 20 to the home position and then stepping the motor 60 through the number of steps corresponding to the distance from home. Alternatively, the tape drive may keep track of the current step position and find a desired position by calculating the difference in the number of steps to the desired position from the current position.

Because there may be a significant amount of positional play of the head 20 with respect to the lead screw 40, a pair of cantilever springs (not shown) urge the head 20 toward the stepping motor 60. An undesirable side effect of the use of the cantilever springs is a significant amount of load variation seen by the stepping motor 60 when the head 20 is in different positions. That is, the load seen by the motor 60 varies as a function of the vertical position of the head 20.

The magnetic head 20 has two read heads 24, 26, two write heads, 22, 28, and an erase head 30. When data is recorded on magnetic tape by the head 20, the data is first written by one of the write heads 22, 28 and subsequently read by one of the read heads 24, 26 to check the integrity of the newly written data.

Figure 1:
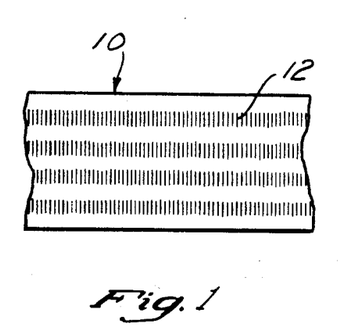
FIG. 1 illustrates a section of magnetic tape used in connection with a cartridge tape drive.

The magnetic tape used in connection with a streaming cartridge tape drive has a plurality of substantially parallel data tracks which run along its length. A portion 10 of such a tape is illustrated in FIG. 1. While the tape 10 shown has four data tracks 12, such magnetic tape may have twenty data tracks between its edges. Data is recorded to the tape in a serial fashion on one track 12 at a time. When one track has been fully read from or written to, the direction of the tape is reversed, and another data track is read from or written to in the opposite direction. This bi-directional capability saves time which would otherwise be lost during tape rewinding.

The magnetic head has two read heads 24, 26 and two write heads 22, 28 to allow for this bi-directional capability. When magnetic tape passes over the head 20 from left to right in FIG. 2, the tape may be written by the upper write head 22 and subsequently read by the upper read head 26 to check the data for accuracy. When a new data track 12 is to be recorded and the tape passes over the head 20 in the opposite direction, from right to left, the lower write head 28 may write data to the tape while the read head 24 subsequently checks it for accuracy.

The stepping motor used in the assembly 16 may be any type of conventional stepping motor. The particular stepping motor actually used is a two-stack, four-phase, permanent magnet stepping motor with 12 poles on each stack for a total of 24 poles. In any stepping motor, the angle through which the rotor rotates in a single step is governed by the number of poles on the rotor and the stator. The particular stepping motor described above rotates 15° per step.

For purposes of clarity, the operation of a stepping motor is described in connection with a four-phase motor having four poles on the stator and two poles on the rotor. The exact same excitation sequences described herein can be used to drive either the 4-pole motor or the 24-pole motor actually used, since both are four-phase motors. The only difference which results is that the 24-pole motor rotates 15° per step, while the 4-pole motor rotates 90° per step.

Figure 3A:
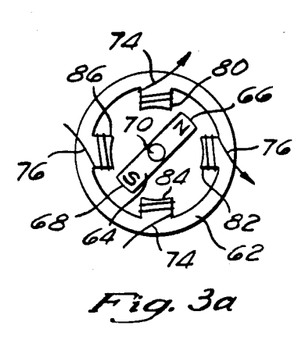
FIG. 3a is a schematic view of a four-phase stepping motor with its rotor in a first position.

The operation of a stepping motor can be explained with reference to FIGS. 3a–3e. As illustrated in FIG. 3a, the stepping motor includes a stator 62, an axle 70, and a rotor 64 which causes rotation of the axle 70, which in turn, drives the lead screw 40. The position of rotor 64, which is a permanent magnet having a north pole 66 and a south pole 68, is controlled by creating magnetic fields in four poles 80, 82, 84, 86. A length of wire is coiled around the poles 80, 84 on the upper and lower portions of the stator, respectively, to form a winding 74, and another length of wire is coiled around the poles 82, 86 on the right and left sides of the stator, respectively, to form a winding 76. As shown in FIG. 3a, the winding 74 is coiled counterclockwise around the poles 80, 84 from bottom to top. The winding 76 is coiled counterclockwise around the poles 82, 86, from left to right. When currents are introduced into the windings 74, 76, magnetic fields are produced in the poles on the stator 62, the direction of each magnetic field being dependent upon the direction of the current.

For example, the rotor 64 in FIG. 3a has its north end positioned directly between the poles 80, 82 on the stator 62. This rotor position is caused by an upward current flow in the winding 74 and a rightward current in the winding 76, as indicated by the arrows. The upward current flow in the winding 74 induces a south magnetic field on the pole 80, and the rightward current in the winding 76 induces a south magnetic field on the pole 82. As a result, the north end of the rotor 64 is attracted to the vector sum of these south poles, which lies directly between the poles 80, 82. The rotor 64 will remain fixed in this position as long as the currents in the windings 74, 76 remain unchanged.

Figure 3B:
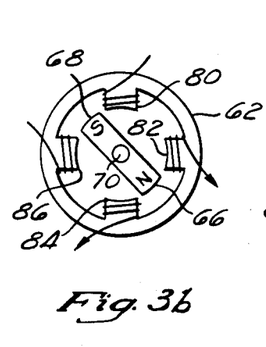
FIG. 3b is a schematic view of the stepping motor of FIG. 3a with the rotor in a second position.

When the direction of the current in the winding 74 is effectively reversed, the rotor 64 will rotate through 90° in the clockwise direction and come to rest directly between the poles 82, 84. Since the current in the winding 76 remained unchanged, the pole 82 still acts as a south pole. However, since the current in the winding 74 is now flowing down as indicated by the arrow, a south magnetic field is induced in the pole 84. As a result, the rotor 64 is caused to align itself with the vector sum of these two south poles 82, 84.

Figure 3C:
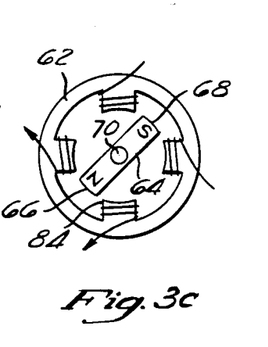
FIG. 3c is a schematic view of the stepping motor with the rotor in a third position.
Figure 3D:
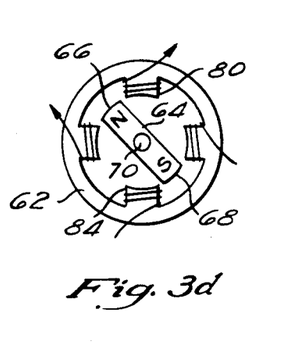
FIG. 3d is a schematic view of the stepping motor with the rotor in a fourth position.
Figure 3E:
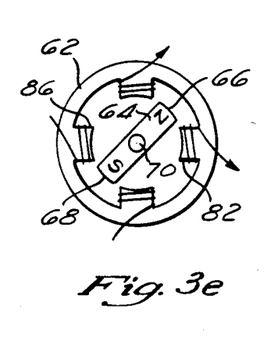
FIG. 3e is a schematic view of the stepping motor with the rotor in the first position.

FIGS. 3c–3e illustrate the rotor positions when the currents through the windings flow as indicated by the arrows. The rotor 64 illustrated in FIG. 3e has returned to its original position (FIG. 3a) after having been rotated through 360°.

Figure 4:
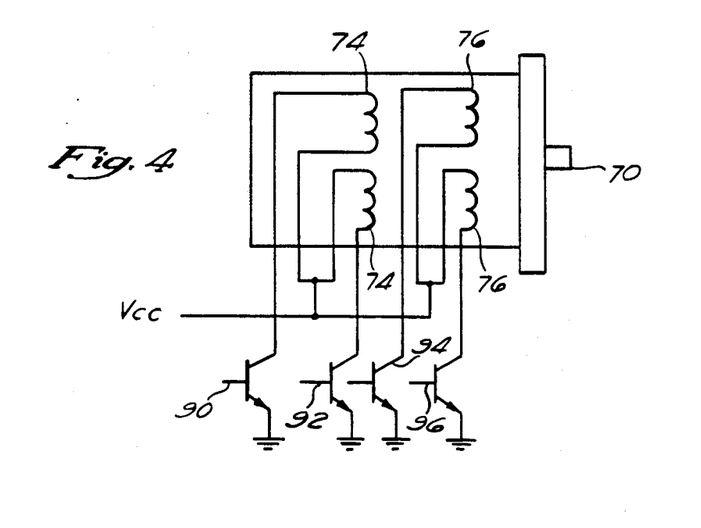
FIG. 4 is a schematic view of the stepping motor shown in FIGS. 3a-3e.

The generation of the currents through the windings 74, 76 can be understood with reference to FIG. 4, which is a schematic diagram of the stepping motor and a driving circuit comprising four transistors 90, 92, 94, 96. One end of the winding 74 is connected to the collector of the transistor 90 while the other end is connected to the transistor 92. The emitters of the transistors 90, 92 are connected to ground, and the winding 74 has a center tap which is connected to a voltage supply. The winding 76 is similarly connected, with its upper end connected to the collector of the transistor 94 and its lower end connected to the collector of the transistor 96. The emitters of these two transistors 94, 96 are also connected to ground, and the winding 76 has a center tap which is connected to the voltage supply.

During operation, exactly one of the transistors 90, 92 connected to winding 74 will be turned on to conduct current, and exactly one of the transistors 94, 96 will also be turned on to conduct. When the transistor 90 is turned on and the transistor 92 is off, current will flow from the voltage supply upward through the upper portion of the winding 74 and down through the transistor 90 to ground. When the transistor 92 is turned on and the transistor 90 turned off, current will flow from the voltage supply down through the lower portion of the winding 74 and to ground through the transistor 92. Similarly, when the transistor 94 is on and the transistor 96 is off, an upward current will flow through the upper portion of the coil 76. When transistor 94 is off, and transistor 96 is on, current will be induced to flow down through the lower portion of the winding 76.

The upper portion of the schematic winding 74 shown in FIG. 4 corresponds to the winding 74 around the pole 80 illustrated in FIG. 3a. The lower schematic winding 74 corresponds to the winding 74 around the pole 84. The upper schematic winding 76 corresponds to the winding 76 around the pole 82, and the lower schematic winding 76 corresponds to the winding 76 around the pole 86. Thus, an upward flow of current through each of the schematic windings 74, 76 shown in FIG. 4 corresponds to the current flow in the windings 74, 76 in FIG. 3a as illustrated by the arrows. The following table more fully correlates the on/off states of each of the transistors 90, 92, 94, 96 to the resultant positions of the rotor 64 in FIGS. 3a–3e.

TABLE 1

| Step | $T_{90}$ | $T_{92}$ | $T_{94}$ | $T_{96}$ | FIG. |
|------|------|------|------|------|------|
| 1 | ON | OFF | ON | OFF | 3a |
| 2 | OFF | ON | ON | OFF | 3b |
| 3 | OFF | ON | OFF | ON | 3c |
| 4 | ON | OFF | OFF | ON | 3d |
| 1 | ON | OFF | ON | OFF | 3e |

As indicated by Table 1, in order to move the rotor 64 from its position as shown in FIG. 3a to its position in FIG. 3b, the transistors 94, 96 must remain on and off, respectively, and the transistor 90 must be turned off while transistor 92 must be turned on. As soon as the transistors 90, 92 are switched to their new states, the rotor 64 will begin to move towards its position as shown in FIG. 3b. When it reaches this position however, it will tend to oscillate about the position, gradually coming to rest.

Figure 5:
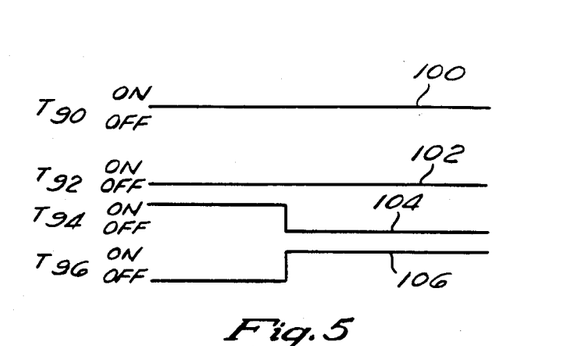
FIG. 5a illustrates a typical single step excitation for a stepping motor.
FIG. 5b illustrates the undamped oscillatory single step response of a stepping motor.
Figure 5B:
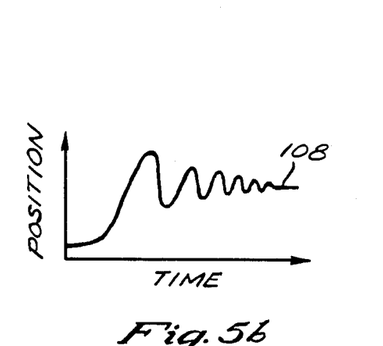

FIG. 5a illustrates a change of the conducting states of the transistors 90, 92, 94, 96 as function of time. Simply switching the states of the transistors 94, 96 once as is indicated by the lines 104, 106, which is the way a stepping motor is typically excited, results in the oscillatory single step response illustrated in FIG. 5b. The oscillatory response, which consists of an alternate series of gradually decreasing "overshoots" and "undershoots," takes approximately 100 milliseconds to decay in the particular magnetic head and motor assembly 16 described above.

Figure 6A:
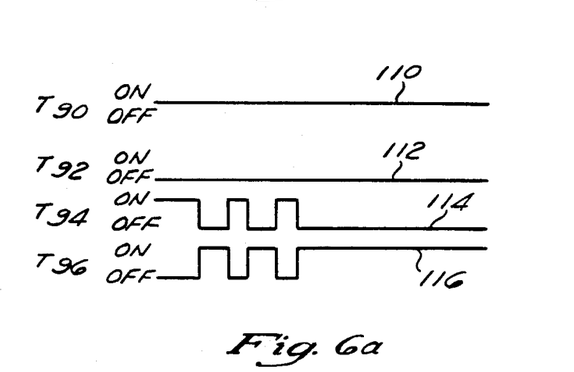
FIG. 6a illustrates an excitation sequence of a stepping motor in its single step mode of operation in accordance with the invention.
Figure 6B:
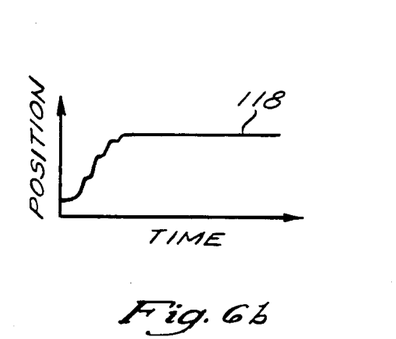
FIG. 6b illustrates a damped single step response of a stepping motor in accordance with the invention.

The invention provides a novel excitation sequence for the single step mode of operation of a stepping motor which allows the settling time of the oscillatory single step response to be significantly reduced to approximately one-fifth of the normal undamped settling time. This is accomplished by repeatedly alternating the forward and reverse phases of the stepping motor as illustrated in FIG. 6a. Instead of simply turning the transistor 94 off and the transistor 96 on, these transistors are repeatedly switched off and on before they are switched to their new conducting states. The resultant single step response, illustrated in FIG. 6b, approximates the critically damped response of a stepping motor, causing the resultant settling time to be significantly reduced.

The times at which the transistors 94, 96 are repeatedly switched depends upon a number of criteria. For purposes of the discussion of FIG. 6a, the forward phase is defined as the time periods when the transistor 94 is off and the transistor 96 is on as indicated by the lines 114, 116, and the reverse phase is defined as the time periods when the transistor 94 is on the the transistor 96 is off. Thus, each of the lines 114, 116 consists of a number of alternating forward and reverse phases. In general, it should be noted that each forward phase urges the rotor 64 towards its destination, whereas each reverse phase urges the rotor towards its starting point. Since it is desired to move the rotor from its starting point to its destination, the length of each alternating forward phase must be greater than that of each reverse phase. For purposes of this discussion, the phase ratio is defined as the ratio of the length of time of the forward phase to that of the reverse phase. Thus, the phase ratio should always be greater than one. In one embodiment of the invention, each forward phase lasts 0.9 milliseconds, while each reverse phase lasts 0.6 milliseconds, resulting in a phase ratio of 1.5. It has been found that a phase ratio in the range of 1.25 to 2.00 should be used in order to most effectively damp the single step response of a stepping motor. In addition, the duration of the forward phase must be greater than the electrical time constant $\tau$ of the motor, where $\tau = L/R$, and L is the inductance of the motor and R is the resistance of the motor. Finally, the number of times the reverse phase is activated is another factor which affects the single step response. While the lines 114, 116 in FIG. 6a indicate that the reverse phase is activated twice, the single step response is most effectively damped when the reverse phase is activated from two to eight times before the final forward phase is activated.

Figure 7:
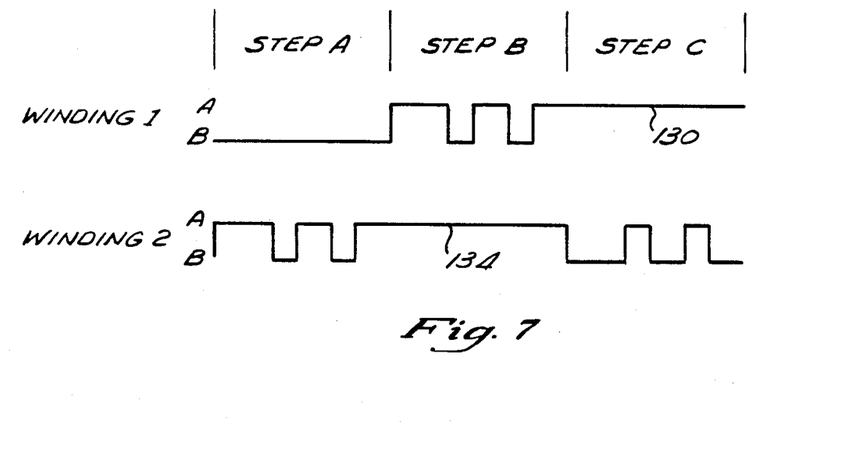
FIG. 7 illustrates an excitation sequence used to run a bipolar stepping motor in its slewing mode of operation in accordance with the invention.

Another feature of the invention includes a novel excitation sequence for driving a stepping motor in its slewing mode of operation. This excitation sequence incorporates the use of alternating forward phases and reverse phases for each step in a predetermined number of steps. FIG. 7 illustrates such an excitation sequence for three steps of a bipolar motor. A bipolar motor, which may have two wire windings, is driven by alternately reversing the current flow through one winding at a time. The lines 130, 134 in FIG. 7 indicate the direction, A or B, of current flow in each of the windings 1 and 2 respectively, direction A being the reverse of direction B. In step A, the forward phases correspond to current flow, in direction A in winding 2 while the reverse phases correspond to current flow in direction B of winding 2.

In step A of FIG. 7, winding 2 is given an initial forward phase of 1.0 ms, a reverse phase of 0.4 ms, a second forward phase of 0.6 ms, a second reverse phase of 0.4 ms, and a final forward phase of 0.6 ms. The times for which the forward and reverse phases are activated for steps B and C are identical to those of step A. Although FIG. 7 indicates that only two reverse phases are used in each step, more reverse phases could be used. The criteria for determining the number and duration of the reverse phases in the slewing mode of operation are similar to those used in the single stepping mode.

Figure 8:
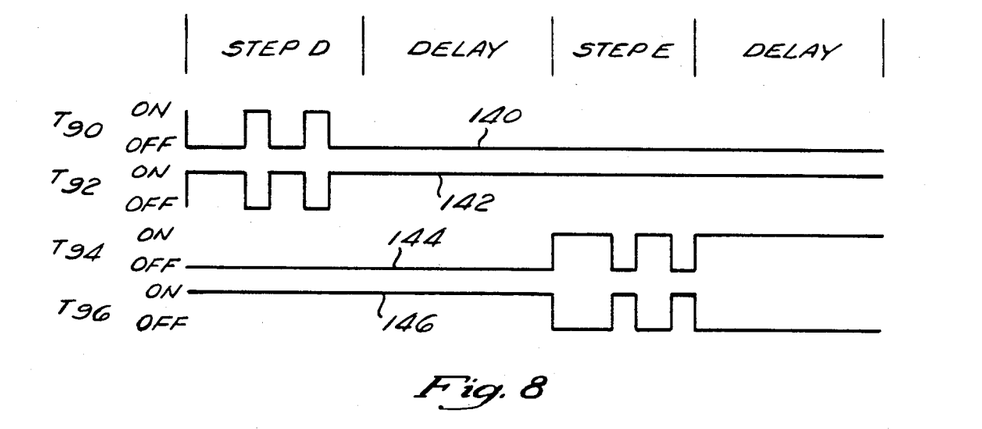
FIG. 8 illustrates an excitation sequence used to run a unipolar stepping motor in its slewing mode of operation in accordance with the invention.

FIG. 8 illustrates a similar excitation sequence for driving a unipolar motor. In such a motor, only half of each winding is energized at a time. Since the motor shown in FIG. 3a is a unipolar motor, current flows through only one-half of the windings 74,76 at any time. For example, the two arrows in FIG. 3a illustrate current flow through the top half of the winding 74 and the right half of the winding 76. If the motor in FIG. 3a were a bipolar motor, current would flow through both parts of the windings 74,76 at all times. A unipolar motor is used because it allows for simpler driving circuitry. The practical effect of using a bipolar motor instead of a unipolar one is that stronger magnetic fields are produced, resulting in greater acceleration of the rotor.

The excitation sequence of FIG. 8 takes into account the weaker magnetic fields produced in a unipolar motor. Step D, which represents a counterclockwise rotor advancement from its position in FIG. 3d to that of FIG. 3c, is followed by a delay which allows an extra period of time for the rotor to reach its final position due to its lower acceleration. Each step in the excitation sequence is followed by a similar delay period.

The excitation sequence for each step in FIG. 8 as represented by the lines 140,142,144,146, consists of an initial forward phase of 1.5 ms, a reverse phase of 0.6 ms, a second forward phase of 0.9 ms, a second reverse phase of 0.6 ms, and a final forward phase of 0.9 ms, which remains unchanged for a delay period of an additional 5.0 ms.

The utilization of the alternate forward and reverse phases during each step when the motor is in its slewing mode of operation allows for a dramatically increased slewing frequency to be attained. For example, the excitation sequence for each step in FIG. 7 has a duration of 3.0 ms, which corresponds to a slewing frequency of 333 Hz. When the same motor and head assembly as that used in FIG. 7 was driven without this novel excitation sequence, the maximum satisfactory slewing frequency was 100 Hz, more than three times slower.

The excitation sequences in accordance with the invention are produced by a computer software subroutine which is stored in a read-only-memory (ROM). The subroutine generates the necessary forward and reverse excitations for a single step of the motor. Thus, if the motor is operating in its single step mode, the subroutine is invoked repeatedly, once for each step. When a delay is required between each step, such as in the case of a unipolar motor, the delay is achieved by delaying the invocation of the subroutine between each step.

The benefits of the invention may be obtained regardless of the particular type of stepping motor used. While a permanent magnet motor is disclosed, a variable reluctance motor may be used. The number of poles on the stator and the rotor of the particular stepping motor used is not significant in obtaining the benefits of the invention. While the method disclosed utilizes full stepping of the motor, half stepping or microstepping may also be used in connection with the invention.

Further modifications and alternative embodiments of the invention will be apparent to those skilled in the art in view of the foregoing description. Accordingly, this description is to be construed as illustrative only, and is for the purposes of teaching those skilled in the art a manner of carrying out the invention. The details of the structure may be varied substantially without departing from the spirit of the invention, and the exclusive use of such modifications as comes within the scope of the appended claims is contemplated.

I claim:

1. An apparatus for finely positioning a magnetic read/write head in a cartridge tape drive by moving said magnetic head a single step, said apparatus comprising:

a magnetic head;

a stepping motor with a rotor;

means coupled to said magnetic head and said motor for translating an angular displacement of said rotor to a linear displacement of said magnetic head;

means for generating a reverse excitation tending to cause said rotor to occupy a first angular position within said motor;

means for generating a forward excitation tending to cause said rotor to occupy a second angular position within said motor; and means for causing said rotor to rotate a single step starting from said first position and ending at said second position by supplying to said motor a sequence of excitations comprising a first forward excitation, a first reverse excitation, a second forward excitation, a second reverse excitation, and a final forward excitation, the ratio of the duration of each of said forward excitations except said final forward excitation to the duration of the following reverse excitation being substantially in the range of one and one-fourth to two.

2. An apparatus as claimed in claim 1 wherein said ratio is substantially equal to one and one-half.

3. An apparatus as claimed in claim 1 wherein the number of reverse excitations supplied to said motor during a single step is between two and eight.

4. An apparatus as claimed in claim 1 wherein each of said reverse excitations is of substantially equal duration.

5. An apparatus for positioning a magnetic read/write head in a cartridge tape drive, comprising:

a magnetic head;

a stepping motor with a rotor;

means coupled to said magnetic head and said motor for translating an angular displacement of said rotor to a linear displacement of said magnetic head;

means for generating a reverse excitation tending to cause said rotor to occupy a first position within said motor;

means for generating a forward excitation tending to cause said rotor to occupy a second position which is angularly displaced from said first position by a single step;

driving means coupled to said generating means for causing said rotor to move through a predetermined number of steps, each of which is produced by a sequence of excitations supplied to said motor, said sequence comprising a first forward excitation, a first reverse excitation, a second forward excitation, a second reverse excitation and a final forward excitation.

6. An apparatus as claimed in claim 5 wherein said stepping motor is a two-stack, four-phase motor having twenty-four magnetic poles whereby said rotor rotates through an angle of substantially 15° per step.

7. An apparatus for positioning a magnetic read/write head in a cartridge tape drive, comprising:

a magnetic head;

a stepping motor with a rotor;

means coupled to said magnetic head and said motor for translating an angular displacement of said rotor to a linear displacement of said magnetic head;

means for generating a reverse excitation tending to cause said rotor to occupy a first position within said motor;

means for generating a forward excitation tending to cause said rotor to occupy a second position which is angularly displaced from said first position by a single step;

driving means coupled to said generating means for causing said rotor to move through a predetermined number of steps, an intermediate number of which are produced by a sequence of excitations supplied to said motor, said sequence comprising a first forward excitation, a first reverse excitation, a second forward excitation, a second reverse excitation, and a final forward excitation, the ratio of the duration of each of said forward excitations except said final forward excitation to the duration of the following reverse excitation being substantially in the range of one and one-fourth to two.

8. An apparatus as claimed in claim 7 wherein said ratio is substantially equal to one and one-half.

9. An apparatus as claimed in claim 7 where the number of reverse excitations supplied to said motor during a single step lies in the range of two to eight.

10. An apparatus as claimed in claim 7 wherein each of said reverse excitations is of substantially equal duration.

11. An apparatus as claimed in claim 5 wherein a predetermined delay is provided between each step in said predetermined number of steps.

12. An apparatus as claimed in claim 5 wherein each of said predetermined number of steps is produced by the same sequence of excitations.

13. A method of driving a stepping motor in its single-stepping mode of operation comprising the steps of:

(a) generating a reverse excitation tending to cause the rotor of said stepping motor to occupy a first angular position within said motor;

(b) generating a forward excitation tending to cause said rotor to occupy a second angular position which is angularly displaced from said first position by a single step; and (c) causing said rotor to rotate a single step starting from said first position and ending at said second position by supplying to said motor a sequence of excitations comprising a first forward excitation, a first reverse excitation, a second forward excitation, a second reverse excitation, and a final forward excitation, the ratio of the duration of each of said forward excitations except said final forward excitation to the duration of the following reverse excitation being substantially in the range of one and one-fourth to two.

14. A method as claimed in claim 13 wherein said ratio is substantially equal to one and one-half.

15. A method as claimed in claim 13 wherein the number of reverse excitations supplied to said motor during a single step lies in the range of two to eight.

16. A method as claimed in claim 13 wherein each of said reverse excitations is of substantially equal duration.

17. A method of driving a stepping motor a plurality of steps comprising the steps of:

(a) generating a reverse excitation tending to cause the rotor of said stepping motor to occupy a first angular position within said motor;

(b) generating a forward excitation tending to cause said rotor to occupy a second angular position which is angularly displaced from said first position by a single step; and (c) causing said rotor to move through a predetermined number of steps, each of which is produced by a sequence of excitations supplied to said motor, said sequence comprising a first forward excitation, a first reverse excitation, a second forward excitation, a second reverse excitation, and a final forward excitation.

18. A method of driving a stepping motor a plurality of steps comprising the steps of:

(a) generating a reverse excitation tending to cause the rotor of said stepping motor to occupy a first angular position within said motor;

(b) generating a forward excitation tending to cause said rotor to occupy a second angular position which is angularly displaced from said first position by a single step; and (c) causing said rotor to move through a predetermined number of steps, each of which is produced by a sequence of excitations supplied to said motor, said sequence comprising a first forward excitation, a first reverse excitation, a second forward excitation, a second reverse excitation, and a final forward excitation, the ratio of the duration of each of said forward excitations except said final forward excitation to the duration of the following reverse excitation being substantially in the range of one and one-fourth to two.

19. A method as claimed in claim 18 wherein said ratio is substantially equal to one and one-half.

20. A method as claimed in claim 17 wherein the number of reverse excitations supplied to said motor during a single step lies in the range of two to eight.

21. A method as claimed in claim 18 wherein each of said reverse excitations is of substantially equal duration.

22. A method as claimed in claim 17 additionally comprising the step of including a predetermined delay between each step in said predetermined number of steps.

23. A method as claimed in claim 17 wherein each of said predetermined number of steps is produced by said sequence of excitations.

24. An apparatus for finely positioning a magnetic read/write head in a cartridge tape drive by moving said magnetic head a single step, said apparatus comprising:
- a magnetic head;
- a stepping motor with a rotor;
- a positioner coupled to said magnetic head and said motor that translates an angular displacement of said rotor to a linear displacement of said magnetic head;
- a circuit that generates a reverse excitation tending to cause said rotor to occupy a first angular position within said motor and a forward excitation tending to cause said rotor to occupy a second angular position within said motor; and
- a drive circuit that causes said rotor to rotate a single step starting from said first position and ending at said second position by supplying to said motor a sequence of excitations comprising a first forward excitation, a first reverse excitation, a second forward excitation, a second reverse excitation, and a final forward excitation, the ratio of the duration of each of said forward excitations except said final forward excitation to the duration of the following reverse excitation being substantially in the range of one and one-fourth to two.

25. An apparatus as claimed in claim 24 wherein said ratio is substantially equal to one and one-half.

26. An apparatus as claimed in claim 25 wherein the number of reverse excitations supplied to said motor during a single step is between two and eight.

27. An apparatus as claimed in claim 26 wherein each of said reverse excitations is of substantially equal duration.

28. An apparatus for positioning a magnetic read/write head in a cartridge tape drive, comprising:
- a magnetic head;
- a stepping motor with a rotor;
- a positioner coupled to said magnetic head and said motor for translating an angular displacement of said rotor to a linear displacement of said magnetic head;
- an excitation circuit that generates a reverse excitation tending to cause said rotor to occupy a first position within said motor and a forward excitation tending to cause said rotor to occupy a second position which is angularly displaced from said first position by a single step;
- a circuit coupled to said excitation circuit that causes said rotor to move through a predetermined number of steps, an intermediate number of which are produced by a sequence of excitations supplied to said motor, said sequence comprising a first forward excitation, a first reverse excitation, a second forward excitation, a second reverse excitation and a final forward excitation.

29. An apparatus as claimed in claim 28 wherein each of said reverse excitations is of substantially equal duration.

30. An apparatus as claimed in claim 29 wherein a predetermined delay is provided between each step in said predetermined number of steps.

31. An apparatus as claimed in claim 30 wherein each of said predetermined number of steps is produced by the same sequence of excitations.

32. An apparatus for positioning a magnetic read/write head in a cartridge tape drive, comprising:
- a magnetic head;
- a stepping motor with a rotor;
- a positioner coupled to said magnetic head and said motor that translates an angular displacement of said rotor to a linear displacement of said magnetic head;
- an excitation circuit that generates a reverse excitation tending to cause said rotor to occupy a first position within said motor and a forward excitation tending to cause said rotor to occupy a second position which is angularly displaced from said first position by a single step; and
- a driving circuit coupled to said excitation circuit for causing said rotor to move through a predetermined number of steps, each of said steps being produced by the same sequence of excitations supplied to said motor, said sequence comprising a first forward excitation, a first reverse excitation, a second forward excitation, and second reverse excitation and a final forward excitation.

33. An apparatus as claimed in claim 32 wherein a predetermined delay is provided between each step in said predetermined number of steps.

* * * * *